US006480227B1

United States Patent
Yoneyama

(10) Patent No.: US 6,480,227 B1
(45) Date of Patent: Nov. 12, 2002

(54) SOLID-STATE IMAGING DEVICE

(75) Inventor: Toshikazu Yoneyama, Tsurugashima (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/049,982

(22) Filed: Mar. 30, 1998

(30) Foreign Application Priority Data

Mar. 31, 1997 (JP) .............................. 9-098236

(51) Int. Cl.[7] .............................................. H04N 3/14
(52) U.S. Cl. ...................... 348/308; 348/297; 348/301; 250/208.1
(58) Field of Search ........................ 250/208.1; 358/482, 358/483; 348/294, 296, 297, 298, 300, 301, 302, 303, 304, 307–312, 315–317, 319; H04N 3/14

(56) References Cited

U.S. PATENT DOCUMENTS

| | | | | |
|---|---|---|---|---|
| 4,942,474 A | * | 7/1990 | Akimoto | 348/204 |
| 5,144,447 A | * | 9/1992 | Akimoto | 348/301 |
| 5,572,257 A | * | 11/1996 | Conrads | 348/308 |
| 5,668,375 A | * | 9/1997 | Petrick | 250/208.1 |
| 5,719,626 A | * | 2/1998 | Yoneyama | 348/301 |
| 5,909,026 A | * | 6/1999 | Zhou | 250/208.1 |
| 6,037,577 A | * | 3/2000 | Tanaka | 348/302 |
| 6,255,638 B1 | * | 7/2001 | Eralouto | 348/308 |
| 6,377,304 B1 | * | 4/2002 | Saitoh | 348/308 |

* cited by examiner

*Primary Examiner*—Ngoc-Yen Vu
(74) *Attorney, Agent, or Firm*—Morgan, Lewis & Bockius LLP

(57) ABSTRACT

A solid-state imaging device according to the present invention includes a plurality of amplifying picture elements for converting optical signals to electrical signals, amplifying the electrical signals and outputting the electrical signals, wherein at least one readout line for reading out the signals from a predetermined number of picture elements among the plurality of amplifying picture elements is employed. A plurality of switching devices are connected between each output of the plurality of amplifying picture elements and the corresponding readout lines.

68 Claims, 3 Drawing Sheets

SOLID-STATE IMAGING DEVICE

This application claims the benefit of Application No. 09-098236, filed in Japan on Mar. 31, 1997, which is hereby incorporated by reference.

BACKGROUND OF THE INVENTION

1. Field of the Invention

The present invention relates to a solid-state imaging device and, in particular, to an apparatus that can be used for industrial robots or a variety of inspection devices. By employing functions that conduct the operation of summing the product of image signals from the imaging unit of a solid-state imaging device, it is possible to capture an image from the imaged data of a subject as well as output the image data after processing, without using a high-performance processor and without imposing an excessive burden on secondary processors due to the image processing.

2. Discussion of the Related Art

Currently, image processing devices used for industrial robots and various inspection devices have been designed such that image capturing of the object to be measured is implemented using a solid-state imaging device, such as a CCD. The captured image signal or data is sent to a high-performance processor that sequentially conducts various operations on the imaged data. The solid-state imaging device is generally only for capturing the image, and normally the captured data from the solid-state imaging device is processed by secondary processing devices.

Unfortunately, the number of picture elements of a solid-state imaging device ranges from the tens of thousands to several hundred thousand, and may even reach several million picture elements/frame. Therefore, the amount of image data obtained from the picture elements is enormous. Thus, in order to conduct processing for this enormous amount of image data in real time, it is necessary to have extremely high capacity processing. Also, it is necessary to substantially increase the transmission speed of the data between the CCD, memory, and the processor as well as increasing the processing speed of the processor. A drawback has been of overly burdening of the systems. Most notably the processor was over-burdened. As a result of trying to address these drawbacks, the size of the apparatus was increased, which also increased the costs to produce it.

One method employed to solve the attendant drawbacks is to use two processors, rather than one, to conduct the processing of the image and other processing. One processor may be dedicated to image processing only. This is an effective method when the target object of the image processing is limited to the picture element under consideration and its periphery, such as for differential processing. However, when the entire image area is the target object, such as for a fast Fourier transformation (FFT), even designating a processor for image processing only results in inadequate performance. Additionally, there are many applications wherein it is difficult to avoid the imaging apparatus from becoming excessively large and expensive.

In recent years there have been attempts to integrate an arithmetic circuit for image processing into the solid-state imaging device. However, because of the multitude of devices being employed for operations in the picture element unit, as the size of the chip of the solid-state imaging device increases the aperture number decreases, resulting in deterioration in the image sensing performance.

The object of the present invention is to obviate one or more of the above problems of the solid-state imaging devices of the prior art and to implement product summing of the picture element unit of the solid-state imaging device with a simple circuit structure, and to conduct high-speed image capturing of the subject as well as processing without placing an excessive burden on the processors due to picture processing.

SUMMARY OF THE INVENTION

Accordingly, the present invention is directed to a solid-state imaging device that substantially obviates one or more of the problems due to limitations and disadvantages of the related art.

An object of the present invention is to provide a solid-state imaging device with a simple apparatus structure that is capable of conducting all operations from image capturing to image processing.

Another object of the present invention is to provide a solid-state switching device capable of turning on only one of a plurality of readout lines simultaneously.

A further object of the present invention is to provide a solid-state imaging device that can conduct high-speed arithmetic processing.

A still further object of the present invention is to provide a solid-state imaging device that can conduct high-speed arithmetic processing without an external processor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the solid-state imaging device includes a plurality of amplifying picture elements for converting and amplifying optical signals and outputting the optical signals, at least one readout line for reading out signals from a predetermined number of picture elements among the plurality of amplifying picture elements, and a plurality of switching devices connected between each output of the plurality of amplifying picture elements and the corresponding readout lines.

In another aspect, the solid-state imaging device includes solid-state imaging device includes multiple picture elements wherein each of the picture elements includes a photodetector that converts optical signals into an electrical charge and stores it, an amplifying device that amplifies the electrical charge signal that is stored by the photodetector, a transfer device that transfers the electrical charge signal that is stored by the photodetector to a control electrode of the amplifying device, and a resetting device that resets the electrical charge of the control electrode of the amplifying device, wherein the multiple picture elements are arranged in an orientation of rows and columns along two dimensions and conduct a signal readout as a current signal, multiple vertical readout lines provided on each of the columns in order to readout signals from the picture elements that are arranged on each corresponding column, multiple switching devices wherein each switching device corresponds to each of the picture elements and is connected between the output of the amplifying device of the picture element and the corresponding vertical readout line, a horizontal readout line that outputs the signal from the multiple vertical readout lines, and horizontal switching devices in correspondence to each of the vertical readout lines and supplies signals from each vertical readout line to the horizontal readout line. In still another aspect, the solid-state imaging device includes an exposure method, wherein the solid-state imaging device exposure method includes the steps of turning off the transfer devices of all of the picture elements during the designated exposure time and transferring the electrical charge of the photodetector devices to the control electrode of the amplifying devices by turning on the transfer devices of all the picture elements again, detecting signals with a designated frequency component by letting n be a positive integer and finding a first sum total by conducting a simultaneous read out of n-rows at a time, skipping every other n-rows, or n-columns at a time skipping every other n-columns, determining the second sum total by conducting a simultaneous read out of n-rows at a time skipping every other n-rows between the n-rows at a time that were read out, or n-columns at a time skipping every other n-columns between the n-columns at a time that were read out, and determining a difference between the first and the second sum totals by using the differential circuit.

In the solid-state imaging device an exposure is conducted by turning off the transfer devices of all the picture elements during the designated exposure time, and transferring the electrical charge of the photodetector devices to the control electrode of the amplifying devices by turning on the transfer devices of all the picture elements again. The signals with the designated frequency component are then detected by letting n be a positive integer and finding the first sum total by conducting a simultaneous read out of n-rows at a time, skipping every other n-rows at a time, or n-columns at a time, skipping every other n-columns at a time. The second sum total is found by performing a simultaneous read out of n-rows at a time, skipping every other n-rows between the n-rows at a time that were read out, or n-columns at a time, skipping every other n-columns at a time, between the n-columns at a time that were read out. The difference is then determined between the first and second sum totals by using the differential circuit.

This configuration makes it possible to select individual amplifying image elements and to output the image elements on a readout line as a current signal using the same method as the solid-state imaging devices disclosed in the prior art. It is possible to conduct various types of image processing inside the solid-state imaging device by compositing the output signals from the amplifying image elements or calculating a sum of the products by controlling the switching device connected between the output of the amplifying image elements and the corresponding readout line. By processing the image data inside the solid-state imaging device, without placing too great of a burden on the processor for image processing, it is possible to achieve a solid-state imaging device with a simple apparatus structure that is capable of conducting all operations from image capturing to image processing.

It is advantageous for the switching devices that are to be connected to the same readout line to be configured so that it is possible to turn on only one or a plurality of readout lines simultaneously. If a plurality of switching devices are turned on, the picture elements are displayed as a composite of the plurality of the readout lines on the readout line.

If only one of the switching devices is turned on at a given time, it is possible to obtain an individual output signal from each picture element. If a plurality of the switching devices are simultaneously turned on, the output of the plurality of the picture elements can be displayed as a composite signal on the readout line, where it is possible to perform summing of the output of a plurality of picture elements. Therefore, without conducting image processing by an external processor, the solid-state imaging device can conduct high-speed arithmetic processing.

The above designs allow the sequentially read out signals from each of the picture elements, via a vertical readout line and a horizontal readout line, as is done with the solid-state imaging device of the prior art. It is possible to output signals from multiple picture elements by converting them into a composite signal, on a vertical readout line or a horizontal readout line, by controlling a switching device that is connected between the output of the amplifying device of the picture elements and their corresponding vertical readout line. Thus, by using the design of the present invention, the operation of summing products can be conducted for the output signal of multiple picture elements inside the solid-state imaging device. Consequently, high-speed picture processing can be implemented with a simple circuit design. Moreover, the processor designated for image processing only is not excessively burdened due to image processing performed in this manner. The circuit configuration is simple because only a switching device is added to the picture element unit of the solid-state imaging device of the prior art and the drawbacks, such as the enlarging of the chip size or the decreasing of the aperture number, is prevented.

By additionally providing a current/voltage conversion circuit, connected to the horizontal readout line, a read out voltage output is obtained via the current/voltage conversion circuit. By connecting the current/voltage conversion circuit to the horizontal readout line, it is possible to accept output signals that are read out from the picture elements as current signals via the vertical readout line and the horizontal switching device and obtain the corresponding voltage output. This configuration makes it possible to obtain a voltage signal as the output signal while taking advantage of the current readout mode.

For the switching devices connected to the same vertical readout line, it is possible to turn on only one or a plurality of readout lines simultaneously, and it is possible to configure the circuit such that if a plurality of switching devices are simultaneously turned on the output of the plurality of picture elements can be converted and displayed as a composite on the vertical readout line.

For the switching devices connected to the same vertical readout line, at a time when only one switching device is turned on, it is possible to output a signal individually from each picture element onto the vertical readout line. Furthermore, when a plurality of the switching devices are turned on simultaneously, the sum of the products operation for the output of a plurality picture elements is conducted by making a composite of the output of a plurality picture elements on the vertical readout line.

Moreover, for the horizontal switching devices it is possible to have a configuration that only one or a plurality of switching devices can be turned on, and if a plurality of switching devices are turned on the outputs of the plurality of switching devices of the picture elements are converted into a composite of the outputs and the composite output is displayed on the horizontal readout line.

If only one horizontal switching device is turned on at a given time, it is possible to output an individual output signal from each picture element from the horizontal readout line. On each vertical readout line, it is possible to output picture elements output from each row sequentially. By simultaneously turning on a plurality of switching devices connected to the vertical readout line, it is possible to output the sum of the products operation for the output of the picture elements form a plurality of rows by simultaneously turning on a plurality of switching devices connected to the vertical readout line. This allows the creation of a composite of signals from more than one picture element in the same row and different columns on the horizontal readout line, or the creation of a composite of signals from a plurality of picture elements in different rows and the same column on the horizontal readout line.

Additionally, it is advantageous to also incorporate a differential circuit into the design that is capable of finding the difference between the signals that are sequentially read out on the horizontal readout line.

By connecting the differential circuit to the horizontal readout line, the difference between the signals that are read out sequentially are determined, as well as the difference between the signals obtained by calculating the sum of the products output for each of a plurality of picture elements.

The present invention also provides for the capability of having at least a primary vertical scanning circuit that supplies a selection control signal for picture elements that are provided on every row and a secondary vertical scanning circuit that supplies signals to control the switching devices.

Due to the provision of providing a primary vertical scanning circuit that supplies a selection control signal for each picture element that is provided on every row, which is similar to the prior art, and a secondary vertical scanning circuit that controls the switching devices, the present invention is capable of performing operations that are similar to those conducted by the solid-state imaging devices of the prior art that were mainly performed by the primary vertical scanning circuit. The secondary scanning circuit operations, such as the summing of products, are performed done by controlling the switching devices. By doing so, the structure of the peripheral circuit of the solid-state imaging device is simplified and control is facilitated.

An exposure can be performed by turning off the transfer devices for all the picture elements during the designated exposure time. The electrical charge of the photodetector device is transferred to the control electrode of the amplifying device by turning on the transfer device of all the picture elements again. A batch exposure operation is then performed with the shutter function by selecting picture elements with the switching device from every row reading out the signals from each column to each vertical readout line. The signals are then sequentially outputted from each vertical readout line to the horizontal readout line, in series, using the horizontal switching devices.

This structure allows for the simultaneous transfer of the electrical charges of all the picture elements from the transfer device to the control electrode of the amplifying device. The switching device is then used to read out the signals of each picture element onto each vertical readout line, as well as to output the signals of each vertical readout line in a time sequence by using the horizontal switching devices. The present invention is capable of transferring the electrical charges of the photodetector to the control electrode in advance of the exposure. The electrical charges can also be outputted to the resetting device by turning on the transfer devices of all the picture elements. This allows for a simultaneous resetting of all the picture elements and a simultaneous transferring of the electrical charges of all the picture elements afterward. Therefore, it is possible to operate the solid-state imaging device as an image sensor for a batch exposure having a shutter function, as in a CCD device.

An exposure is capable of being performed in the present invention by turning off the transfer devices of all the picture elements during the designated exposure time and transferring the electrical charge of the photodetector device to the control electrode of the amplifying device by turning on the transfer device for all the picture elements again. A composite of the electrical charge of the picture elements in each picture element area across multiple rows and multiple columns is then read out sequentially.

The compositing of the electrical charges of the picture elements in each picture element area across multiple rows and multiple columns and being read out sequentially, allows for the removal of noise by averaging the signals of the multiple picture elements. Therefore, although the resolution decreases, the sensitivity increases and an image of a dark subject with reduced noise can be obtained.

The present invention further allows for and contemplates that a portion of each of the picture element areas that are sequentially read out overlap each other. By having a portion of each of the picture element areas overlapping each other, an image can be read out with reduced noise while maintaining the horizontal and/or vertical scanning speed at a designated value.

Additionally, it is possible to have a structure wherein the picture element areas that are sequentially read out are shifted by one picture element. If the picture element areas that are sequentially read out are shifted by one picture element, it is possible to have a horizontal and/or vertical scanning speed that is the same as when a picture element area is read out one picture element at a time. The displaying of the picture or recording can be easily conducted using a typical device.

The picture element areas that are sequentially read out can also be adjacent to each other. By arranging the picture element areas that are sequentially read out so that they are adjacent to each other, improved frame speed can be obtained so that a high speed read out can be performed. Because the outputs of more than one picture element are composited and read out, even when this kind of high speed readout is conducted, the total amount of electrical charge increases and consequently the sensitivity does not decrease. In other words, it is possible to carry out high speed operations as well as maintain a high sensitivity readout.

An exposure can be performed by turning off the transfer devices of all the picture elements during the designated exposure time and transferring the electrical charge of the photodetector devices to the control electrode of the amplifying devices by turning on the transfer devices of all the picture elements again. The signals of the designated frequency component can then be detected by letting n be a positive integer and finding the first sum total by conducting a simultaneous readout of n-rows at a time, or every other n-rows, or n-columns at a time, or every other n-columns. The second sum total can then be found by conducting a simultaneous readout of n-rows at a time skipping every other n-rows between the n-rows at a time that were read out, or n-columns at a time skipping every other n-columns between the n-columns at a time that were read out. The difference between the first and second sum totals is then found using the differential circuit.

The present circuit structure is capable of detecting signals having each frequency component in the vertical or horizontal direction of the image. For example, by letting n=1, the maximum frequency in the vertical or horizontal direction is detected. When n=2, the frequency component at ½ of the maximum frequency is detected. When n=3, the frequency component at ⅓ of the maximum frequency is detected. In other words, signals at the desired frequency component for the image can be easily detected without using an additional filter or signal processor. Therefore, it is possible to take a Fourier transformation of the spatial image through the detection of signals with various frequency components obtained by calculating the sum totals of the first and second sum totals and finding the difference between them for various values of n.

By setting n to various values, detecting signals with various frequency components and adding them, a Fourier transformation of the spatial image can easily be performed. The implementation of a Fourier transformation with a simple device circuit structure of the present invention makes it unnecessary to use a signal processor or filter.

The projection of each row can be obtained by summing the total of the picture elements for each row by selecting signals from all the columns using the horizontal switching device as well as by reading out by sequentially selecting each row. The projection of each column similarly can be obtained by adding the signals from the picture elements of all the rows using the switching device and obtaining the sum total of the signals for each column on the vertical readout line, and then sequentially reading out the signals for each column using the horizontal switching device.

This configuration is capable of obtaining a projection that is the addition of the components of each row or each column of the image, representing a type of characteristic value of the image. Therefore, a special image processing device is not necessary for the solid-state imaging device of the present invention to easily obtain the projection of each row or each column.

The solid-state imaging device of the present invention is also capable of conducting a readout and signal processing for only the picture elements on a portion of the screen using the switching device and the horizontal switching devices.

The solid-state imaging device is capable of conducting a resetting of the picture elements and a transfer of the signals from all the picture elements and is further capable of conducting a readout for only a portion of the picture elements by using the switching device and the horizontal switching devices. Thus, operations and processing for only a portion of the picture elements can be performed. Therefore, it is possible to effectively obtain only the necessary image information. Additionally, the resetting of the picture element portion can be conducted individually and separately from the readout by the switching devices. Therefore, with partial scanning, by conducting a resetting of unnecessary picture elements during the non-readout time, the solid-state imaging device is able to prevent the so-called blooming and smearing effects, which are due to the saturation of non-used picture elements.

The solid-state imaging device of the present invention is capable of performing the operation of summing the product of the signals from the picture elements by using the switching device as a variable resistance device.

The switching device can be a MOS transistor or similar device, wherein the voltage of the control signal applied to the gate is not a digital signal, which has only two values, but rather is an analog signal. By utilizing the analog signal the switching device can be used as a variable resistance device. Therefore, by outputting the signal from each picture element with a change in the gain a weighted summing of products can easily be performed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The solid-state imaging device related to an embodiment of the present invention is described by referring to drawings as follows.

Figure 1:
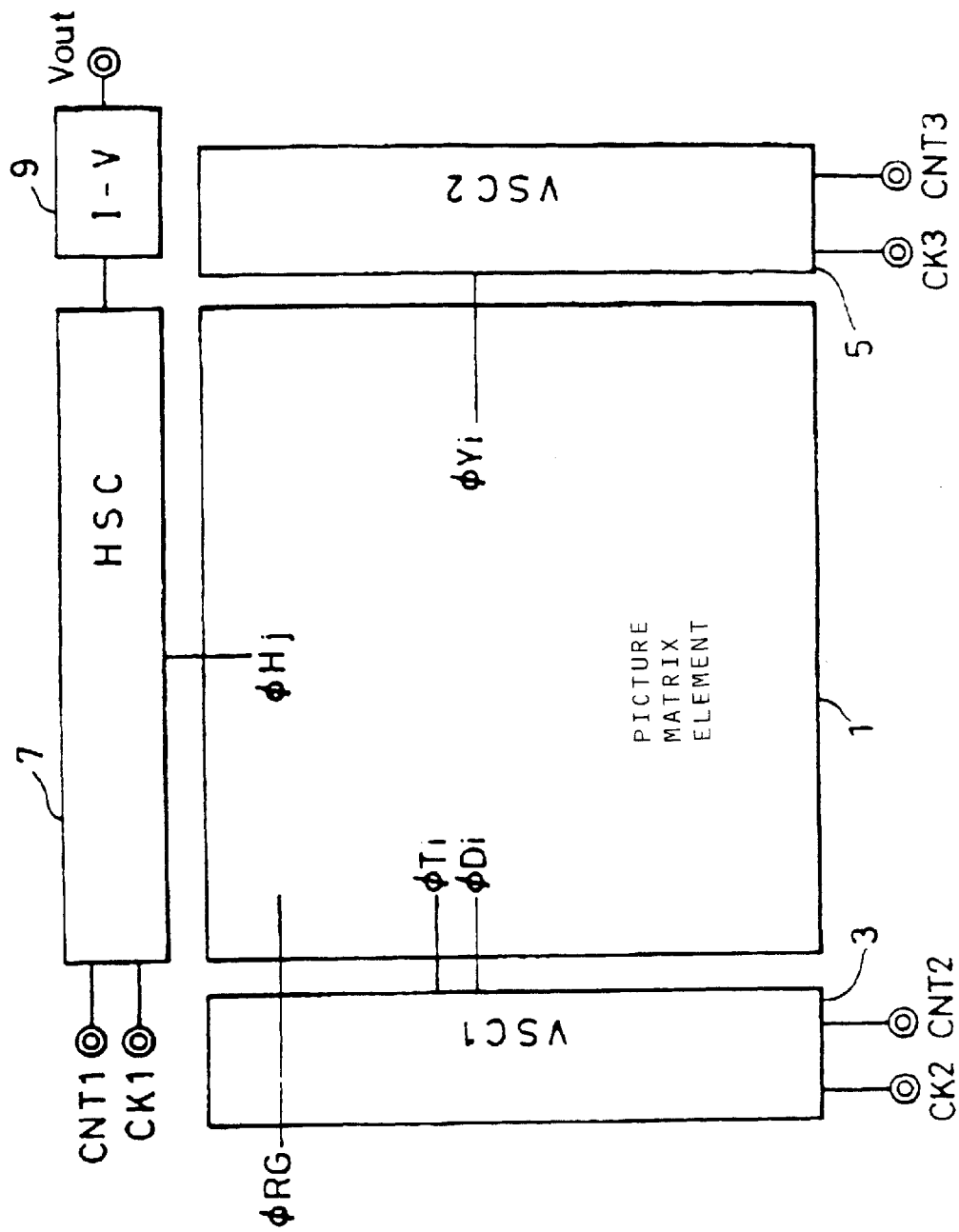
FIG. 1 is a block diagram that shows the schematic structure of the solid-state imaging device of an embodiment of the present invention.

FIG. 1 shows the schematic structure of a solid-state imaging device of an embodiment of the present invention.

As shown in FIG. 1, the solid-state imaging device of the present invention includes a picture element matrix 1 with amplifying picture elements for a non-destructive readout, arranged in-rows and columns, primary vertical scanning circuit 3 (VSC1) and secondary vertical scanning circuit 5 (VSC2) that supplies control signals for each picture element that is in the direction of the internal rows of each picture element of picture element matrix 1. A horizontal scanning circuit 7 (HSC) selects each picture element of the picture element matrix from any single column or multiple columns, and a current/voltage conversion circuit 9.

Figure 2:
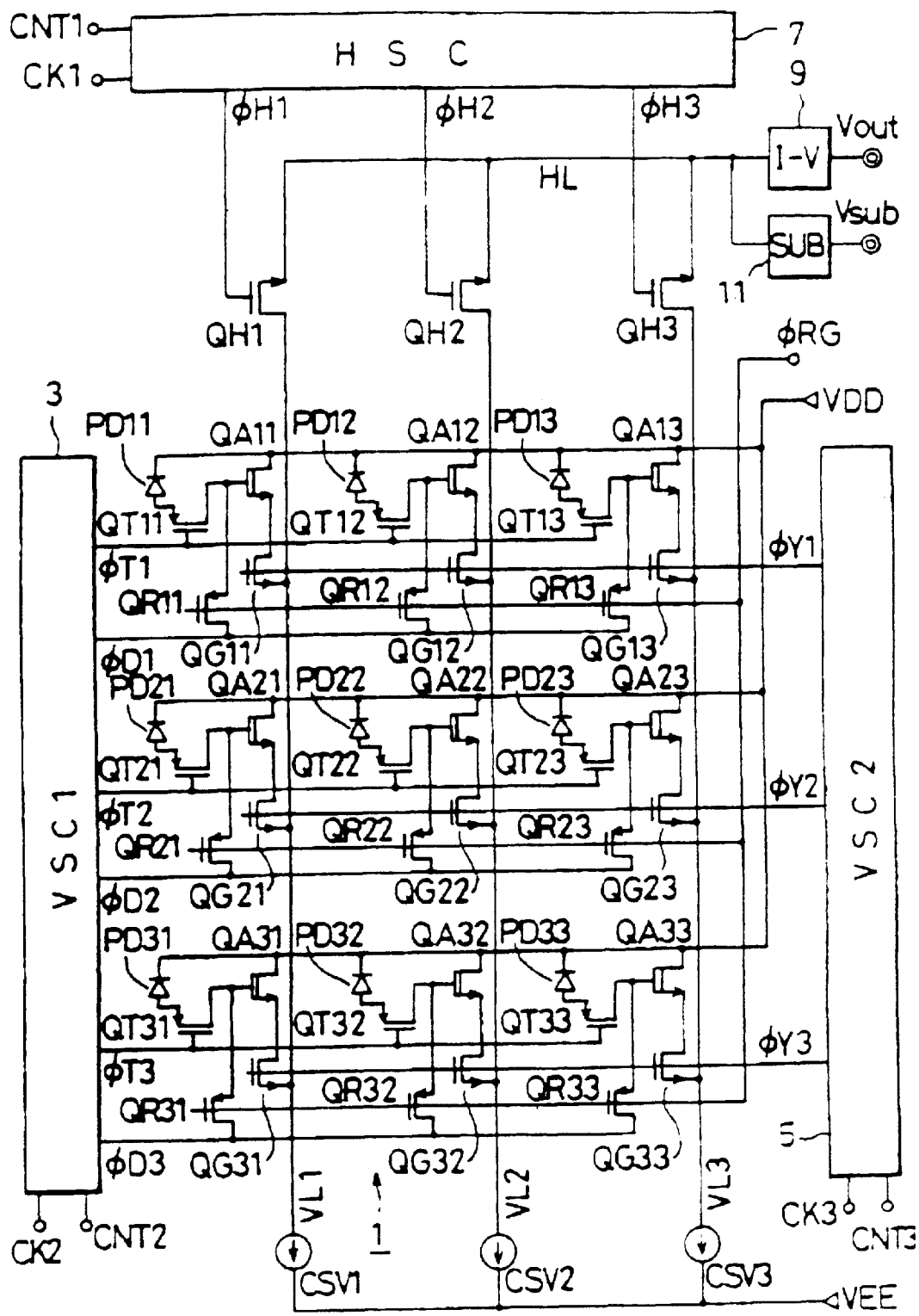
FIG. 2 is a block diagram of a circuit that shows a detailed circuit structure of the solid-state imaging device of FIG. 1.

FIG. 2 shows additional structure details of the solid-state imaging device of FIG. 1. FIG. 2 depicts an image sensor wherein picture elements are arranged in a matrix of 3-rows by 3-columns for the purpose of simplifying the explanation.

Each picture element includes a photodiode $PD_{ij}$, which is a photodetector, an amplifying device $QA_{ij}$, including a Junction-Gate Field Effect Transistor (JFET), a transfer switch $QT_{ij}$, including a MOS transistor for transferring the electrical charges of the photodiodes $PD_{ij}$ to a gate of the amplifying device $QA_{ij}$, and a reset switch $QR_{ij}$, including a MOS transistor for setting the gate electrode of the amplifying device $QA_{ij}$ to the designated voltage. Control switch $QG_{ij}$, includes a MOS transistor, is also included (i=1, 2, 3, and j=1, 2, 3).

The sources of the amplifying devices of the picture elements arranged in the vertical direction, i.e., the column direction, for amplifying devices $QA_{ij}$ for each picture element are connected in common to column line $VL_j$ of each column via the main current circuit (circuit between drain and source) of control switch device $QG_{ij}$. The column line $VL_j$ of each column is connected to a constant current source $CSV_j$. The opposing ends of each constant current source $CSV_j$ is connected in common to the power source VEE. The drain of each amplifying device $QA_{ij}$ is connected in common to designated power source VDD.

A cathode of the photodiode PDij of each picture element, that is also connected in common with the designated power source VDD, is the same as the drain of each of the amplifying devices QAij. The anode is connected to the source of the corresponding transfer switch QTij. The drain of the transfer switch QTij is connected to the gate of amplifying device QAij and the source of resetting switches QRSTij. The gate of each transfer switch QTij is connected in common to a primary vertical scanning circuit 3 (VSC1) in every row, so that it receives a primary vertical scanning signal φTi.

The gate of the reset switch QRij is connected to the control signal φRG that is common for all the picture elements. The drain is connected to the primary vertical scanning circuit 3 (VSC1) that is common for every column and the secondary vertical scanning signal φDi is supplied to every row.

The drain of each control switch QGij is connected to the source of the amplifying device QAij inside the same picture element and the source of each control switch QGij is connected to the vertical readout line VLj for each column. The gate of each control switch QGij is connected in common to the secondary vertical scanning circuit 5 (VSC2) per row and a tertiary vertical scanning signal φYi is received.

The primary vertical scanning circuit 3 (VSC1) and secondary vertical scanning circuit 5 (VSC2) includes a shift register and switching device. At primary vertical scanning circuit 3 (VSC1), every time a clock signal CK2 is added, a control signal CVT2 is sequentially transferred for a time interval corresponding to the time required for an incrementing of the internal shift register, and the primary vertical scanning signal φTi and secondary vertical scanning signal φDi are outputted during this period. At the secondary vertical scanning circuit 5 (VSC2), every time a clock pulse CK3 is added, a control signal CNT3 is sequentially transferred for a time interval corresponding to the time required for an incrementing of the internal shift register, and tertiary vertical scanning signal φYi is outputted during this period.

As depicted, in FIG. 2, the opposing end of each vertical readout line VLj is connected to the drain of the horizontal readout switching device QHj (j=1, 2, 3) of each column. The source of each horizontal readout switch QHj is connected to a common horizontal readout line HL.

The horizontal readout line HL is a connected to the input of current/voltage conversion circuit 9 and a differential circuit 11 which (will described in detail later). The output of the current/voltage conversion circuit 9 and the differential circuit 11 are readout as an output signal Vout and a differential output signal Vsub, respectively.

Each gate of the horizontal readout switch QHj is connected to the output of each circuit line of a horizontal scanning circuit 7 (HSC). The horizontal scanning circuit 7 (HSC) includes a shift register and switch, as do the primary and secondary vertical scanning circuits 3 and 5. At horizontal scanning circuit 7 (HSC), every time a clock pulse CK1 is added, the data from a control signal CNT1 are sequentially shifted by an increment of one and horizontal scanning signal φHj, used for controlling each horizontal readout switch device QHj sequentially or simultaneously controlling a plurality of horizontal readout switch devices (which will be described later), is outputted.

The operation of the solid-state imaging device with the above-described circuit configuration will now be described in detail. A readout is conducted for the solid-state imaging device, as shown in FIGS. 1 and 2. The following detailed description is based on the secondary vertical scanning circuit 5 (VSC2) operating entirely in a selection state and every control switching device QGij is operating in a continuity state.

Resetting the amplifying Qai, device is accomplished by causing primary scanning circuit 3 (VSC1) to conduct a shifting action by setting control signal CNT2, that is supplied to the primary vertical scanning circuit 3 (VSC1), to be high, while at the same time adding vertical clock signal φCK2. Switch QRij is then turned on for all the picture elements by resetting control signal φRG. For the selected rows, the voltage of the secondary vertical scanning signal φDi is set to a voltage VGII (not shown) at which the amplifying device QAij for each picture element is turned on and activated. The picture elements on a non-selected row are set to a voltage VGL (not shown) at which the amplifying device QAij is cutoff. Thus, the gate of amplifying device QAij of the selected row is biased to a voltage VGH (not shown).

In this state, the control signal φRG is turned on. Therefore, the reset switching device QAij is cutoff, however, due to gate parasitic capacitance of the amplifying device QAij, the gate voltage of the amplifying device QAij remains at the reset state voltage of VGH.

In this state, transfer device QTij for the picture elements in the rows selected by the primary vertical scanning signal φTi from the primary vertical scanning circuit 3 (VSC1), is turned on. Thus, the signal charge that is photoelectrically converted by photodiode PDij and stored is sent to the gate of amplifying device QAij and the gate voltage of the amplifying device QAij reaches a voltage that corresponds to the image signal. As described above, the transferred electrical charge is maintained by the parasitic capacitance of the gate of the amplifying device QAij.

In this state, horizontal readout switch QHj of the selected column is turned on. By doing this, the amplifying devices QAij of the selected picture elements are operated and via control switching device QGij the signal current that corresponds to the image signal of the vertical readout line VLj flows. The signal current is converted into a voltage signal by current/voltage conversion circuit 9 via horizontal readout line HL and image output voltage signal Vout is obtained. Therefore, when horizontal readout switch QHj is sequentially turned on by each column, the image signal of the picture elements in the selected row is sequentially read out.

In other words, the operation of the solid-state imaging device with the configuration as described above, which is similar to the operation of the solid-state imaging device of the prior art, if it is assumed that every control switching device QGij is turned on, picture elements are sequentially selected from each row by the primary vertical scanning circuit 3 (VSC1) and a readout is performed, as with the solid-state imaging device of the prior art. One horizontal readout switch QHj is turned on sequentially for every column and the image signal from the selected picture elements of each column are outputted sequentially in series. It is acceptable to not turn on all the control switching devices QGij and instead to sequentially turn on control switching devices QGij for selected rows.

The solid-state imaging device of the present invention, in addition to those operations that are similar to those conducted by the solid-state imaging device of the prior art, is capable of compositing the readout signal of multiple picture elements on the vertical readout line VLj by turning on multiple rows of control switching devices QGij. Moreover, the horizontal scanning circuit 7 (HSC) can simultaneously turn on multiple horizontal readout control signals φHJ. Therefore, multiple signals from vertical readout line VLj can be converted into a composite readout signal on the horizontal readout line HL. In other words, signals from picture elements from multiple columns can be converted into a composite readout signal on the horizontal readout line HL. It is possible to convert into a composite readout signal and output the signals from the picture elements from multiple rows and multiple columns to the horizontal readout line HL.

Figure 3:
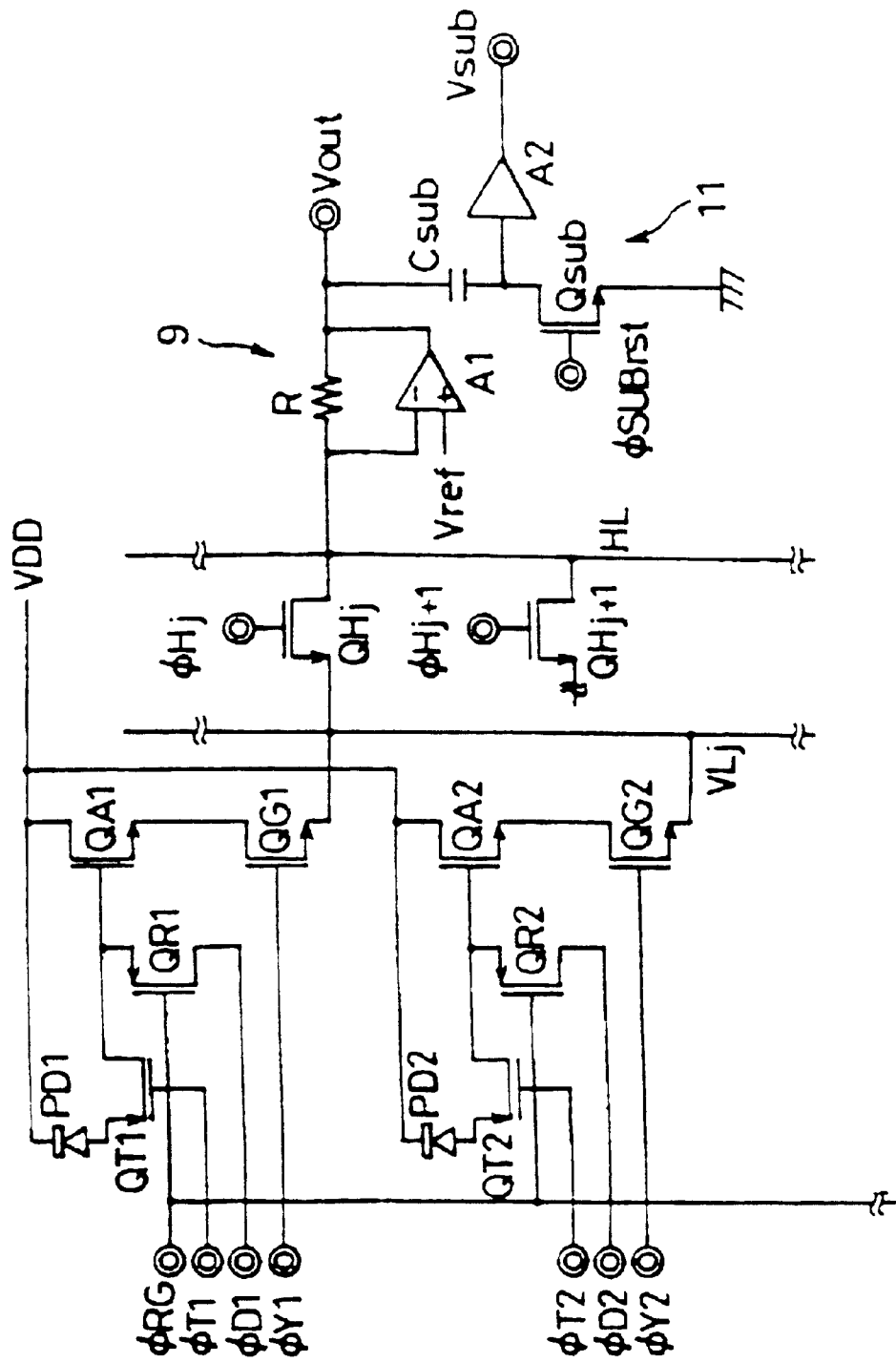
FIG. 3 is an expanded view diagram of an electric circuit of a portion of the solid-state imaging device of FIG. 2.

An operation unique to the present invention will now be described in detail with reference to FIG. 3. FIG. 3 is a diagram of an equivalent circuit that focuses on only two picture elements in the solid-state imaging device related to the present invention. In FIG. 3 the portions that are the same as in the FIGS. 1 and 2 are indicated with the same or corresponding reference names. FIG. 3 shows a picture element of the first row in column No. j, and a picture element of the second row in column No. j, wherein the column number j for each device comprising these picture elements is omitted.

The output of each picture element shown in FIG. 3, the source of the control switching devices QG1 and QG2, are connected in common to the vertical readout line VLj. The vertical readout line VLj is connected to horizontal readout line HL via horizontal readout switching device Qhj. Horizontal readout switching device QHj+1 is connected between VLj and vertical readout line VLj+1 (not shown) is also connected to the horizontal readout line HL. Resistor R and amplifying device A1, that includes current/voltage conversion circuit 9, are connected on the horizontal readout line HL. The inverted input terminal of amplifying device A1 is connected to the horizontal readout line HL and the non-inverted input terminal is connected to reference voltage Vref. The resistor device R is connected between the inverted input terminal and the output terminal of amplifying device A1. The output of amplifying device A1 is connected to the image output terminal (Vout).

In addition, differential circuit 11 is connected to the output of current/voltage conversion circuit 9, i.e., the output of amplifying device Al. Differential circuit 11 includes switching device Qsub that further includes a MOS transistor, a secondary amplifier device A2, and a capacitor Csub. The capacitor Csub is connected between the output of current voltage conversion circuit 9 and the drain of the switching device Qsub. The source of switching device Qsub is connected to Ground. Differential control signal φSUBrst, that performs the differential operation is inputted to the gate of switching device Qsub. The drain of the switching device Qsub is connected to the differential output terminal (Vsub) via amplifying device A2.

The operation of the circuit in FIG. 3 is as follows. First, control signal φRG is sent from a control circuit (not shown), and resetting device QRi (i=1, 2) is turned on. Once QRi is turned on φDi is sent from the vertical scanning circuit and the drain voltage of resetting device QRi is set to voltage VGH so that the amplifying device Ai is turned on and activated. The gate of the amplifying device QAi is also biased at the same voltage VGH. Consequently, a resetting of the amplifying device is conducted. In this state, even though reset device QRi is cutoff by turning off the control signal φRG, due to the effect of the gate parasitic capacitance (not shown), the gate of the amplifying device QAi is maintained in a reset state that is biased to the voltage VGH.

Under these conditions, transfer pulse φTi is sent from primary vertical scanning circuit 3 (VSC1) and transfer device QTi is turned on. Also, the electrical charge, which is photoelectrically converted by photodiode PDi and stored, is then transferred to the gate of the amplifying device QAi and the gate of the amplifying device QAi attains the voltage that corresponds to image signal Pxi. As described above, the transferred electrical charge is maintained by the parasitic capacitance of amplifying device QAi and is not affected by the operation of control switching device QGi, which is described in detail below. In other words, the resetting of the picture element portion and the transfer of the signal are performed without being affected by the scanning of the control switching device QGi.

When control switching device QGi and horizontal readout switch QHj are turned on, a readout current corresponding to the image signal Pxj then flows from the vertical readout line VLj through horizontal readout switch QHj to horizontal readout line HL. This current is called the signal current and is Ixj.

Due to the virtual Ground of amplifying device Ai, the voltage at the inverted input terminal of the amplifying device Ai is equal to the reference voltage Vref. Additionally assuming that the ON resistance of each switching device is small enough and its voltage decrease can be ignored, the voltage of horizontal readout line HL, vertical readout line Vlj, and the source voltage of amplifying device QAi all become equal to the reference voltage Vref and there is no change in the potential of each portion of the circuit due to the signal. As described above, by reading out the particular readout signal in the form of a current signal, there is little decrease in the operational speed, due to the parasitic capacitance, of each portion of the circuit and, therefore, the circuit as described is capable of high-speed operation. The current signal flow on horizontal readout line HL is converted into a voltage signal by a current/voltage conversion circuit including an amplifying device Ai and feedback resistance R, and the output signal Vout is obtained as a voltage signal. In this type of operation, even though multiple rows of picture elements, as shown, in FIG. 3, two picture elements are simultaneously operated and all the current signals from the multiple picture elements are outputted to vertical readout line Vlj. The source voltage of amplifying device QAi is the same as the reference voltage Vref and there is no change. Therefore, the current flow in each amplifying device QAi does not influence any other amplifying device. Therefore, output current Iout, outputted from the vertical readout line VLj becomes the sum total for the operational mode wherein each picture element is operated individually and it can be indicated by the following equation.

$$I_{out} = \sum I \times j \qquad I_{out} = \sum I \times j \qquad \text{(Equation 1)}$$

The output current Iout is converted to a voltage signal by the current/voltage conversion circuit 9, as described above, and the output signal Vout can be obtained.

The solid-state imaging device of the present invention can obtain a composite of the output of the picture elements from multiple rows on the vertical readout line VLj by simultaneously turning on multiple horizontal switching devices QHj. The solid-state imaging device is also capable of producing a composite signal from multiple vertical readout lines on the horizontal readout line HL.

In addition, by using the differential circuit 11, a difference calculation can be conducted. For example, first all of the picture elements that have a negative coefficient are selected and the sum total (ΣI×n) is determined. Then, the sum total ($\Sigma I \times n$) is converted into a voltage signal by the current/voltage conversion circuit 9 and storage capacitor Csub is charged with the voltage signal by turning on switching device Qsub. After switching device Qsub is turned off, the total ($\Sigma I \times p$) of all the picture elements that have a positive coefficient are summed and by outputting the total ($\Sigma I \times p$) from the current/voltage conversion circuit 9 via the storage capacity Csub and the amplifying circuit A2, the arithmetic operation shown by the following equation can be performed.

$$V_{sub} = K^*(\Sigma_{I \times p} - \Sigma_{I \times n}) \quad \text{(Equation 2)}$$

In other words, the difference of the signals that are sequentially read out on horizontal readout line HL can be determined.

Returning to FIG. 2, various image processing operations are depicted that can be performed inside the solid-state imaging device using the above-described functions are described as follows.

If the solid-state imaging device is operated as a standard image sensor, the secondary vertical scanning circuit 5 (VSC2) is placed entirely in the selected state and all of the control switching devices QGi are set to the continuity state. The primary vertical scanning circuit 3 (VSC1) is then operated in the same manner as the solid-state imaging device in the prior art. The picture elements of each row are sequentially selected and horizontal scanning circuit 7 (HSC), the picture elements that belong to each row are sequentially selected one column at a time and the image signal is sequentially read out in series.

The solid-state imaging device can be operated as an image sensor for batch exposures that have a shutter function. This mode of operation currently can be performed with a CCD device but was not possible with an amplifying solid-state imaging device. When the solid-state imaging device is operated as an image sensor, all the picture elements are selected with primary vertical scanning circuit 3 (VSC1) and the resetting of the picture element portion is performed as previously described. In other words, control signal $\phi$Tij for all the picture elements is simultaneously placed in the select state and transfer device QTij for all the picture elements is turned on. Thus, the remaining electrical charge of photodiode PDij is drained off. The transfer device QTij is then turned off and the resetting device QRij is turned on by the control signal $\phi$RG. Under these conditions, the control signal $\phi$Di from primary vertical scanning circuit 3 (VSC1) is used as the reset voltage VGH and the gate of amplifying device QAij is reset. Control signal $\phi$RG is then set high and resetting device QRij is turned off.

With the solid-state imaging device operating as an image sensor the period when transfer device QTij is turned off is the exposure time. After the exposure time is over and the transfer device QTij for all the picture elements is again simultaneously turned on, the electrical charge that was photoelectrically converted and stored by photodiode PDij during the exposure period is transferred to the gate of amplifying device QAij and maintained. During this period the control switching device QGij is still turned off and an output signal is not generated.

Under these conditions, at the gate of amplifying device QAij, an electrical charge that corresponds to the image signal PXij is maintained. Therefore, by sequentially scanning the secondary vertical scanning circuit 5 (VSC2), picture elements from each row are selected and by sequentially scanning the horizontal scanning circuit 7 (HSC), picture elements from each column are selected so that the image signal is output in series. In other words, this method allows the solid-state imaging device to conduct simultaneous resetting of all the picture elements as well as simultaneously transferring the electrical charge of photodiodes PDij to amplifying device QAij. Therefore, it is possible to conduct a simultaneous exposure of all the picture elements. Moreover, for the readout of the electrical charge that is transferred to the gate of amplifying device QAij and stored for all the picture elements, an image signal in series can be outputted when each row is sequentially selected with the control switch QGij and read out.

An example of the imaging operation performed by the solid-state imaging device of the present invention with respect to noise removal processing by averaging will now be described in detail. The electrical charge of the picture elements, by conducting simultaneous exposure and a simultaneous transfer as the image signal that corresponds to the subject image is transferred to the gate of each amplifying device QAij of the picture element portion and maintained. A total of three rows are then simultaneously selected, the row with the picture elements containing the object and the rows immediately above and below that row. The secondary vertical scanning circuit 5 (VSC2) is used to sum the signals of the picture elements containing the object and the picture elements above and below are outputted to each vertical readout line VLj. Similarly for the horizontal scanning circuit 7 (HSC), a total of three columns, which include picture elements containing the object and picture elements to the right and left of it are selected, the sum total of the image signal from all of the nine picture elements, that is the picture element containing the object and the surrounding picture element is outputted. In this manner, by sequentially reading out the sum total of the image signal of all of the nine picture elements, it is possible to obtain an image with reduced noise. In other words, by compositing an electrical charge of the picture elements of every picture element area that has multiple rows x, multiple columns on the vertical readout line and horizontal readout line, and sequentially and continuously reading out, and letting a portion of each picture element area that is continuously read out overlap, it is possible to obtain an image with reduced noise within the range of desired readout speeds, which includes a normal readout speed.

In addition and in particular, with each of the continuously read out picture elements shifted by one, it is possible to obtain an image with reduced noise with the same normal readout speed using the solid-state imaging device of the prior art.

Furthermore, by configuring the solid-state imaging device in such a way that the electrical charge of the picture elements of the picture element area of the multiple rows x multiple columns is composited and sequentially and continuously readout as well as having the picture elements that are sequentially and continuously readout be adjacent to each other, it is possible to conduct a high-speed readout without reducing the sensitivity.

In general, in order to conduct a high-speed readout, normally a readout method with thinning is used that skips rows and columns, for example, by reading out every other one of the rows or the columns. This procedure makes it possible to improve the frame speed and can be performed by the solid-state imaging device of the present invention. However, due to the reduction in the exposure time the sensitivity is reduced.

In order to prevent the reduction of the sensitivity, the electrical charge from each of the multiple row x multiple column picture element areas of picture elements can be composited. The electrical charge is then read out sequentially and continuously the configuration of each picture element area is such that they are adjacent to each other. By way of example, the first and second rows are selected simultaneously and the sum of the signals of the picture elements of the first and second rows is outputted on each vertical readout line VLj. Under these conditions, using horizontal scanning circuit 7 (HSC), the first and second columns are simultaneously selected making it possible to read out the sum of the signal of four picture elements. The third and fourth columns are then simultaneously selected and read out and the sum of the next four picture elements can be read out. In this way, two columns are read out at a time and when the last column is read out the third and fourth rows are the simultaneously read out in a similar manner. By repeating this procedure it is possible to read out with four times the frame speed. As the frame speed increases by a factor of 4, the exposure times decreases by a factor of 4, however, because the signal of the picture element portion is simultaneously read out, the total electrical charge amount becomes four times greater and it is possible to reduce the deterioration of the sensitivity.

An example of the solid-state imaging device operating as a spatial filter will now be described in detail. In this mode of operation, the horizontal scanning circuit 7 (HSC) is used to select the entire column and the secondary vertical scanning circuit 5 (VSC2) is used to simultaneously read out the first, third, fifth, seventh, . . . , 2N+1th rows and the signal of the sum total is stored in storage capacitor Csub of the differential circuit 11. The sum totals of the signals of the picture elements in the second, fourth, sixth, eighth, . . . , 2Nth row are then read out and the difference is found by the differential circuit 11. Thus, the high frequency component in the vertical direction of the image can be detected as the difference output voltage Vsub. Similarly, using the first, second, fifth, sixth, . . . th row, it is possible to obtain ½ of the spatial frequency component by reading out two rows at a time every other two rows, ⅓ of the spatial frequency component by reading out three rows at a time every other three rows, and ¼ of the spatial frequency component by reading out four rows at a time every other four rows. In general, by reading out n-rows at a time every other n-rows, it is possible to obtain the 1/n spatial frequency component.

Therefore, by finding the 1/n spatial frequency component at various n's and summing the spatial frequency components, it is possible to very simply conduct a Fourier transform in the horizontal direction of the spatial image, as well as it doing so at a high speed.

If all the picture elements are selected and read out simultaneously, and an operation similar to the one above is conducted with the horizontal scanning circuit 7 (HSC), the secondary vertical scanning circuit (VSC2)5 can obtain various spatial frequency components, as well as conducting very simple Fourier transformations in the vertical direction of the image, as well as doing so at a high speed.

An example of a solid-state imaging device containing a projection will now be described in detail. A projection is a type of characteristic value and it is the sum of each row and each column component of the image. By finding the projection of each row and each column it is possible to use the projection of each row and column for the recognition of characters. For example, in order to obtain the projection of each row with the solid-state imaging device of the present invention, the signals of the entire column are selected and the sum total is obtained by horizontal scanning circuit 7 (HSC). Furthermore, each row is sequentially selected by secondary vertical scanning circuit 5 (VSC2). In order to obtain the projection of each column, an entire row is selected by secondary vertical scanning circuit 5 (VSC2), and the sum total of the signals of each column is obtained on the vertical readout line VLj and the sum total of the signals of each column is sequentially selected and outputted by horizontal scanning circuit 7 (HSC). The above description assumes that arithmetic processing of the image signal for the entire screen of the image is performed, however, arithmetic processing can be performed of only a portion of the image by partially scanning and not reading out the entire screen as the readout of the image signal. In other words, a resetting of the picture image and the transfer of the signal is conducted for all the picture elements by primary vertical scanning circuit 3 (VSC1). A partial readout is then performed by secondary vertical scanning circuit 5 (VSC2) by sequentially turning on a portion of the control switch device QGij.

In particular, the solid-state imaging device of the present invention can conduct a resetting of the picture element portion, independent of the readout portion, including control switch QGij. Therefore, even when partially scanning is performed, by conducting a reset of the unnecessary picture elements during the non-readout time, the characteristics are such that it is possible to prevent the effects of the saturation of the picture elements not in use, i.e., the so-called blooming and smearing effects. In order to perform this procedure, the vertical scanning circuit is divided into primary and secondary vertical scanning circuits 3 (VSC1) and 5 (VSC2), and a partial readout is conducted with secondary vertical scanning circuit 5 (VSC2). This configuration simplifies the method of control and the structure of each vertical scanning circuit is simplified so that it is easy to design. Of course, it is possible to supply the necessary control signal from a single vertical scanning circuit.

The control switching device QGij of the solid-state imaging device described above includes a MOS transistor, such as an NOMOS transistor. Therefore, the control switching device QGij can act as a variable resistor device. In other words, by having the voltage of control signal φYi that is supplied from secondary vertical scanning circuit to the control switch device QGij not be a digital signal, i.e., having two values, but rather be an analog signal, it possible to use control switching device QGij as a variable resistor device. This makes it possible to obtain a signal current with a change in gain that is the same as the input signal, namely the readout signal from the picture element. The output current Iout takes the value shown in the following formula instead of the simple sum total of the signals of each row.

$$I_{out} = \Sigma_{(Gi \times Pxi)} \quad \text{(Equation 3)}$$

Here, Gi shows the gain that is provided by the control switching device QGij. Thus, it is possible to conduct various image operations on the image signal. Therefore, it is possible to conduct various kinds of arithmetic operations so that it is possible to conduct more complicated and sophisticated operations.

The solid-state imaging device as described is capable of conducting various image processing operations at high speeds, including the calculation of the sum of products inside the solid-state imaging device, using an extremely simple circuit structure without placing an excessive burden on the processing performance of the processor performing the image processing. There is no need to conduct a high-speed high-capacity transfer between the imaging device, memory, and the processor in order to carry out the image processing.

Furthermore, for the solid-state imaging device of the prior art, when a processor designated for image processing is used, it is effective only in, for example, the limited case in which the object under consideration was the picture elements of the object and its surrounding portion, such as with a differential calculation. However, with the present invention, it is not limited to this singular operation. It is possible to have the calculation process carried out at a high speed with the efficiency of a high-speed Fourier transformation, that is used for the case where the entire picture area is the subject.

If the processing device is integrated into the solid-state imaging device, there is no disadvantage, such as having an increase in the chip size or a decrease in the aperture number. Therefore, high performance in an image sensor without enlarging the chip size as well as preventing a decrease in the aperture number can be achieved.

For the solid-state imaging device that uses a non-destructive readout and amplifying picture element, control switching device QGij is connected between the output of the picture elements and the readout line. By simultaneously turning on multiple control switching devices commonly connected to the readout line, simultaneous readout of the multiple picture elements is conducted in the current mode, and the output of these multiple picture elements is composited on the readout line, and then a calculation of the sum of products of the signal of the selected multiple picture elements is conducted.

It will be apparent to those skilled in the art that various modifications and variations can be made in the solid-state imaging device of the present invention without departing from the spirit or scope of the invention. Thus, it is intended that the present invention cover the modifications and variations of this invention provided they come within the scope of the appended claims and their equivalents.

What is claimed is:

1. A solid-state imaging device comprised of:
   multiple picture elements that are arranged in an orientation of rows and columns along two dimensions and that output a signal readout as a current signal, wherein each of the picture elements includes:
      a photodetector that converts optical signals into an electrical charge signal and stores the electrical charge signal;
      an amplifying device that amplifies the electrical charge signal that is stored by the photodetector;
      a transfer device that transfers the electrical charge signal that is stored by the photodetector to a control electrode of the amplifying device; and
      a resetting device that resets the electrical charge signal stored in the control electrode of the amplifying device;
   multiple vertical readout lines provided on each of the columns of the multiple picture elements in order to read out signals from the picture elements that are arranged on a corresponding column;
   multiple switching devices wherein each switching device corresponds to a respective picture element and is connected between an output of the amplifying device of the picture element and a corresponding vertical readout line;
   a horizontal readout line that outputs signals from the multiple vertical readout lines; and
   multiple horizontal switching devices each horizontal switching device corresponding to each of the vertical readout lines, where signals from each vertical readout line are output to the horizontal readout line.

2. The solid-state imaging device according to claim 1, wherein the reading out and processing of signals are only conducted for multiple picture elements on a portion of a screen using the switching device and the horizontal switching device.

3. The solid-state imaging device according to claim 1, wherein the operation of summing the product of the signals from the picture elements is conducted by using the switching device as a variable resistance device.

4. The solid-state imaging device according to claim 1, wherein an exposure is conducted by turning off the transfer device for the multiple picture elements during a designated exposure time and transferring the electrical charge signal of the photodetector device to the control electrode of the amplifying device by turning on the transfer devices of the multiple picture elements again and then conducting a batch exposure operation with a shutter function by selecting picture elements with the switching device from every row, reading out the signals from each column to each vertical readout line and sequentially outputting the signals from each vertical readout line to the horizontal readout line in series using the horizontal switching device.

5. The solid-state imaging device according to claim 4, wherein the reading out and processing of signals are only conducted for the picture elements on a portion of the screen using the switching device and the horizontal switching device.

6. The solid-state imaging device according to claim 1, wherein a readout for each row or column is accomplished by obtaining the sum total of the picture elements for each row by selecting signals from all the columns using the horizontal switching devices and by conducting a read out by sequentially selecting each row, or obtaining the projection for each column by adding the signals from the picture elements of all the rows using the switching device and obtaining the sum total of the signals for each column on the vertical readout line, and then sequentially reading out the signals for each column using the horizontal switching device.

7. The solid-state imaging device according to claim 6, wherein the reading out and processing of signals are only conducted for multiple picture elements on a portion of a screen using the switching device and the horizontal switching device.

8. The solid-state imaging device according to claim 1, further including a current/voltage conversion circuit connected to the horizontal readout line, wherein a read out voltage output is obtained via the current/voltage conversion circuit.

9. The solid-state imaging device according to claim 8, wherein a differential circuit determines a difference between signals that are sequentially read out on the horizontal readout line.

10. The solid-state imaging device according to claim 8, wherein if a plurality of switching devices are turned on, the signals from the multiple vertical readout lines are made into a composite on the horizontal readout line.

11. The solid-state imaging device according to claim 8, further including at least a primary vertical scanning circuit that supplies selection control signals for picture elements that are provided on every row and a secondary vertical scanning circuit that supplies control signals to the switching devices.

12. The solid-state imaging device according to claim 8, wherein an exposure is conducted by turning off the transfer device for the multiple picture elements during a designated exposure time and transferring the electrical charge signal of the photodetector device to the control electrode of the amplifying device by turning on the transfer devices of the multiple picture elements again and then conducting a batch exposure operation with a shutter function by selecting picture elements with the switching device from every row, reading out the signals from each column to each vertical readout line and sequentially outputting the signals from each vertical readout line to the horizontal readout line in series using the horizontal switching device.

13. The solid-state imaging device according to claim 8, wherein the reading out and processing of signals are only conducted for multiple picture elements on a portion of a screen using the switching device and the horizontal switching device.

14. The solid-state imaging device according to claim 8, wherein the solid-state imaging device is capable of turning on only one or a plurality of the multiple switching devices simultaneously that are connected to the same vertical readout line, and wherein in a plurality of switching devices turned on the output of a plurality of the picture elements are made into a composite and outputted on the vertical readout line.

15. The solid-state imaging device according to claim 14, wherein if a plurality of switching devices are turned on, the signals from the multiple vertical readout lines are made into a composite on the horizontal readout line.

16. The solid-state imaging device according to claim 8, wherein an exposure is conducted by turning off the transfer devices for the multiple picture elements during a designated exposure time and transferring the electrical charge signal of the photodetector device to the control electrode of the amplifying device by turning on the transfer devices of the multiple picture elements again and then reading out sequentially, by compositing the electrical charge signals of the multiple picture elements in each picture element area across multiple rows and multiple columns.

17. The solid-state imaging device according to claim 16, wherein a portion of each of the picture element areas that are sequentially read out overlap each other.

18. The solid-state imaging device according to claim 17, wherein the picture element areas that are sequentially read out are shifted by one picture element.

19. The solid-state imaging device according to claim 16, wherein the picture element areas that are sequentially read out are shifted by one picture element.

20. The solid-state imaging device according to claim 16, wherein the picture element areas that are sequentially read out are adjacent to each other.

21. The solid-state imaging device according to claim 1, wherein the reading out and processing of signals are only conducted for multiple picture elements on a portion of a screen using the switching device and the horizontal switching device.

22. The solid-state imaging device according to claim 21, wherein a differential circuit determines a difference between signals that are sequentially read out on the horizontal readout line.

23. The solid-state imaging device according to claim 21, wherein if a plurality of switching devices are turned on, the signals from the multiple vertical readout lines are made into a composite on the horizontal readout line.

24. The solid-state imaging device according to claim 21, further including at least a primary vertical scanning circuit that supplies selection control signals for picture elements that are provided on every row and a secondary vertical scanning circuit that supplies control signals to the switching devices.

25. The solid-state imaging device according to claim 21, wherein an exposure is conducted by turning off the transfer device for all of the picture elements during a designated exposure time and transferring the electrical charge signal of the photodetector device to the control electrode of the amplifying device by turning on the transfer devices of all the picture elements again and then conducting a batch exposure operation with a shutter function by selecting picture elements with the switching device from every row, reading out the signals from each column to each vertical readout line and sequentially outputting the signals from each vertical readout line to the horizontal readout line in series using the horizontal switching device.

26. The solid-state imaging device according to claim 21, wherein the reading out and processing of signals are only conducted for multiple picture elements on a portion of a screen using the switching device and the horizontal switching device.

27. The solid-state imaging device according to claim 21, wherein an exposure is conducted by turning off the transfer device for the multiple picture elements during a designated exposure time and transferring the electrical charge signal of the photodetector device to the control electrode of the amplifying device by turning on the transfer devices of the multiple picture elements again and then reading out sequentially, by compositing the electrical charge signals of the picture elements in each picture element area across multiple rows and multiple columns.

28. The solid-state imaging device according to claim 27, wherein a portion of each of the picture element areas that are sequentially read out overlap each other.

29. The solid-state imaging device according to claim 28, wherein the picture element areas that are sequentially read out are shifted by one picture element.

30. The solid-state imaging device according to claim 27, wherein the picture element areas that are sequentially read out are shifted by one picture element.

31. The solid-state imaging device according to claim 27, wherein the picture element areas that are sequentially read out are adjacent to each other.

32. The solid-state imaging device according to claim 1, wherein if a plurality of switching devices are turned on, the signals from the multiple vertical readout lines are made into a composite on the horizontal readout line.

33. The solid-state imaging device according to claim 32, wherein a differential circuit determines a difference between signals that are sequentially read out on the horizontal readout line.

34. The solid-state imaging device according to claim 32, further including at least a primary vertical scanning circuit that supplies selection control signals for picture elements that are provided on every row and a secondary vertical scanning circuit that supplies control signals to the switching devices.

35. The solid-state imaging device according to claim 32 wherein an exposure is conducted by turning off the transfer device for all of the picture elements during a designated exposure time and transferring the electrical charge signal of the photodetector device to the control electrode of the amplifying device by turning on the transfer devices of all the picture elements again and then conducting a batch exposure operation with a shutter function by selecting picture elements with the switching device from every row, reading out the signals from each column to each vertical readout line and sequentially outputting the signals from each vertical readout line to the horizontal readout line in series using the horizontal switching device.

36. The solid-state imaging device according to claim 32, wherein the reading out and processing of signals are only conducted for multiple picture elements on a portion of a screen using the switching device and the horizontal switching device.

37. The solid-state imaging device according to claim 32, wherein an exposure is conducted by turning off the transfer device for multiple the picture elements during a designated exposure time and transferring the electrical charge signal of the photodetector device to the control electrode of the amplifying device by turning on the transfer devices of the multiple picture elements again and then reading out sequentially, by compositing the electrical charge signals of the picture elements in each picture element area across multiple rows and multiple columns.

38. The solid-state imaging device according to claim 37, wherein a portion of each of the picture element areas that are sequentially read out overlap each other.

39. The solid-state imaging device according to claim 38, wherein the picture element areas that are sequentially read out are shifted by one picture element.

40. The solid-state imaging device according to claim 37, wherein the picture element areas that are sequentially read out are shifted by one picture element.

41. The solid-state imaging device according to claim 37, wherein the picture element areas that are sequentially read out are adjacent to each other.

42. The solid-state imaging device according to claim 1, wherein a differential circuit determines a difference between signals that are sequentially read out on the horizontal readout line.

43. The solid-state imaging device according to claim 42, further including at least a primary vertical scanning circuit that supplies selection control signals for picture elements that are provided on every row and a secondary vertical scanning circuit that supplies control signals to the switching devices.

44. The solid-state imaging device according to claim 42, wherein an exposure is conducted by turning off the transfer device for the multiple picture elements during a designated exposure time and transferring the electrical charge signal of the photodetector device to the control electrode of the amplifying device by turning on the transfer devices of the multiple picture elements again and then conducting a batch exposure operation with a shutter function by selecting picture elements with the switching device from every row, reading out the signals from each column to each vertical readout line and sequentially outputting the signals from each vertical readout line to the horizontal readout line in series using the horizontal switching device.

45. The solid-state imaging device according to claim 42, wherein the reading out and processing of signals are only conducted for multiple picture elements on a portion of a screen using the switching device and the horizontal switching device.

46. The solid-state imaging device according to claim 42, wherein an exposure is conducted by the following steps:
   turning off the transfer devices of all of the picture elements during a designated exposure time and transferring the electrical charge signals of the photodetector devices to the control electrode of the amplifying devices by turning on the transfer devices of all the picture elements again;
   detecting signals with a designated frequency component by letting n be a positive integer and finding a first sum total by conducting a simultaneous read out of every other n-rows at a time, or every other n-columns at a time;
   determining a second sum total by conducting a simultaneous read out of every other n-rows, that are not read in finding the first sum, at a time, or every other n-columns, that are not read in finding the first sum, at a time; and
   determining a difference between the first and the second sum totals by using the differential circuit.

47. The solid-state imaging device according to claim 46, wherein a Fourier transformation is performed through detection of signals with various frequency components obtained by obtaining sum totals of the first and second sum totals and determining a difference between the first and second sum totals for various values of n.

48. The solid-state imaging device according to claim 42, wherein an exposure is conducted by turning off the transfer devices for the multiple picture elements during a designated exposure time and transferring the electrical charge signal of the photodetector device to the control electrode of the amplifying device by turning on the transfer devices of the multiple picture elements again and then reading out sequentially, by compositing the electrical charge signals of the multiple picture elements in each picture element area across multiple rows and multiple columns.

49. The solid-state imaging device according to claim 48, wherein a portion of each of the picture element areas that are sequentially read out overlap each other.

50. The solid-state imaging device according to claim 49, wherein the picture element areas that are sequentially read out are shifted by one picture element.

51. The solid-state imaging device according to claim 48, wherein the picture element areas that are sequentially read out are shifted by one picture element.

52. The solid-state imaging device according to claim 48, wherein the picture element areas that are sequentially read out are adjacent to each other.

53. The solid-state imaging device according to claim 1, further including at least a primary vertical scanning circuit that supplies selection control signals for picture elements that are provided on every row and a secondary vertical scanning circuit that supplies control signals to the switching devices.

54. The solid-state imaging device according to claim 53, wherein an exposure is conducted by turning off the transfer device for the multiple picture elements during a designated exposure time and transferring the electrical charge signal of the photodetector device to the control electrode of the amplifying device by turning on the transfer devices of the multiple picture elements again and then conducting a batch exposure operation with a shutter function by selecting picture elements with the switching device from every row, reading out the signals from each column to each vertical readout line and sequentially outputting the signals from each vertical readout line to the horizontal readout line in series using the horizontal switching device.

55. The solid-state imaging device according to claim 53, wherein the reading out and processing of signals are only conducted for multiple picture elements on a portion of a screen using the switching device and the horizontal switching device.

56. The solid-state imaging device according to claim 53, wherein an exposure is conducted by turning off the transfer devices for the multiple picture elements during a designated exposure time and transferring the electrical charge signal of the photodetector device to the control electrode of the amplifying device by turning on the transfer devices of the multiple picture elements again and then reading out sequentially, by compositing the electrical charge signals of the multiple picture elements in each picture element area across multiple rows and multiple columns.

57. The solid-state imaging device according to claim 56, wherein a portion of each of the picture element areas that are sequentially read out overlap each other.

58. The solid-state imaging device according to claim 57, wherein the picture element areas that are sequentially read out are shifted by one picture element.

59. The solid-state imaging device according to claim 56, wherein the picture element areas that are sequentially read out are shifted by one picture element.

60. The solid-state imaging device according to claim 56, wherein the picture element areas that are sequentially read out are adjacent to each other.

61. The solid-state imaging device according to claim 1, wherein an exposure is conducted by turning off the transfer devices for the multiple picture elements during a designated exposure time and transferring the electrical charge signal of the photodetector device to the control electrode of the amplifying device by turning on the transfer devices of the multiple picture elements again and then reading out sequentially, by compositing the electrical charge signals of the multiple picture elements in each picture element area across multiple rows and multiple columns.

62. The solid-state imaging device according to claim 61, wherein the picture element areas that are sequentially read out are shifted by one picture element.

63. The solid-state imaging device according to claim 61, wherein the picture element areas that are sequentially read out are adjacent to each other.

64. The solid-state imaging device according to claim 61, wherein the reading out and processing of signals are only conducted for multiple picture elements on a portion of a screen using the switching device and the horizontal switching device.

65. The solid-state imaging device according to claim 61, wherein a portion of each of the picture element areas that are sequentially read out overlap each other.

66. The solid-state imaging device according to claim 65, wherein the picture element areas that are sequentially read out are shifted by one picture element.

67. A solid-state imaging device exposure method, wherein the solid-state imaging device exposure method comprises the steps of:

turning off transfer devices of all picture elements during a designated exposure time and transferring electrical charge signals of the picture elements to control electrodes of a plurality of amplifying devices by turning on the transfer devices of all the picture elements again;

detecting signals with a designated frequency component by letting n be a positive integer and finding a first sum total by conducting a simultaneous read out of every other n-rows at a time, or every other n-columns at a time;

determining a second sum total by conducting a simultaneous read out of every other n-rows, that are not read in finding the first sum, at a time, or every other n-columns, that are not read in finding the first sum, at a time; and determining a difference between the first and the second sum totals by using a differential circuit.

68. The solid-state imaging device exposure method according to claim 67, wherein a Fourier transformation is performed through detection of signals with various frequency components obtained by obtaining sum totals of the first and second sum totals and determining a difference between the first and second sum totals for various values of n.

* * * * *